(12) United States Patent
Yang et al.

(10) Patent No.: US 9,216,483 B2
(45) Date of Patent: Dec. 22, 2015

(54) SCREW FASTENING DEVICE

(71) Applicant: HON HAI PRECISION INDUSTRY CO., LTD., New Taipei (TW)

(72) Inventors: Ming-Lu Yang, New Taipei (TW); Ya-Dong Zhang, Shenzhen (CN); Xiao-Xing Ren, Shenzhen (CN)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 246 days.

(21) Appl. No.: 13/873,220

(22) Filed: Apr. 30, 2013

(65) Prior Publication Data

US 2013/0319182 A1 Dec. 5, 2013

(30) Foreign Application Priority Data

May 31, 2012 (CN) .................... 2012 2 02518810 U (51) Int. Cl.
  *B23P 19/06* (2006.01)
  *B23P 19/00* (2006.01)
(52) U.S. Cl.
  CPC ............... *B23P 19/06* (2013.01); *B23P 19/001* (2013.01)
(58) Field of Classification Search
  CPC ...... B23P 19/06; B23P 19/001; B23P 19/004; B23P 19/006; B23P 19/007; B23B 23/06; B23B 23/08
  USPC .................... 81/57.37, 430–433, 435, 54
  See application file for complete search history.

(56) References Cited

U.S. PATENT DOCUMENTS

| 4,815,343 | A | * | 3/1989 | Sofinowski | 81/57.37 |
| 5,480,087 | A | * | 1/1996 | Young et al. | 227/112 |
| 7,055,408 | B2 | * | 6/2006 | Sasaki | 81/54 |
| 2011/0252927 | A1 | * | 10/2011 | Ota et al. | 81/430 |

* cited by examiner

*Primary Examiner* — Hadi Shakeri
(74) *Attorney, Agent, or Firm* — Novak Druce Connolly Bove + Quigg LLP (57) ABSTRACT

A screw device, for screws to a workpiece, comprises a platform, a feeding mechanism, a transferring mechanism, and a mechanism. The transferring mechanism is mounted on the platform and communicating with the feeding mechanism. The locking mechanism comprises a mounting plate, a first driving assembly, a second driving assembly, and a pneumatic sucker. The mounting plate is fixed on the platform. The first driving assembly is mounted on the mounting plate. The second driving assembly is fixedly connected to the first driving assembly. The pneumatic sucker is mounted on an end of the second driving assembly adjacent to the platform, and is located near an end of the first transferring member, the first driving assembly driving the second driving assembly and the pneumatic sucker to move along an axis of the pneumatic sucker. The second driving assembly drives the pneumatic sucker to rotate.

20 Claims, 5 Drawing Sheets

SCREW FASTENING DEVICE

BACKGROUND

1. Technical Field

The present disclosure relates to screw fastening devices, particularly to a pneumatic screw fastening device.

2. Description of Related Art

Screws are used to lock workpieces. An operator may use a screwdriver to manually drive and fasten screws to a workpiece one by one, which result in a low efficiency. In addition, when automatically producing the workpieces, manually fastening screws to the workpieces may cause a huge amount of dedicated manual labor and associated labor costs. Furthermore, the workpieces may be easily damaged by the operator during the manually fastening of screws.

Therefore, there is room for improvement in the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
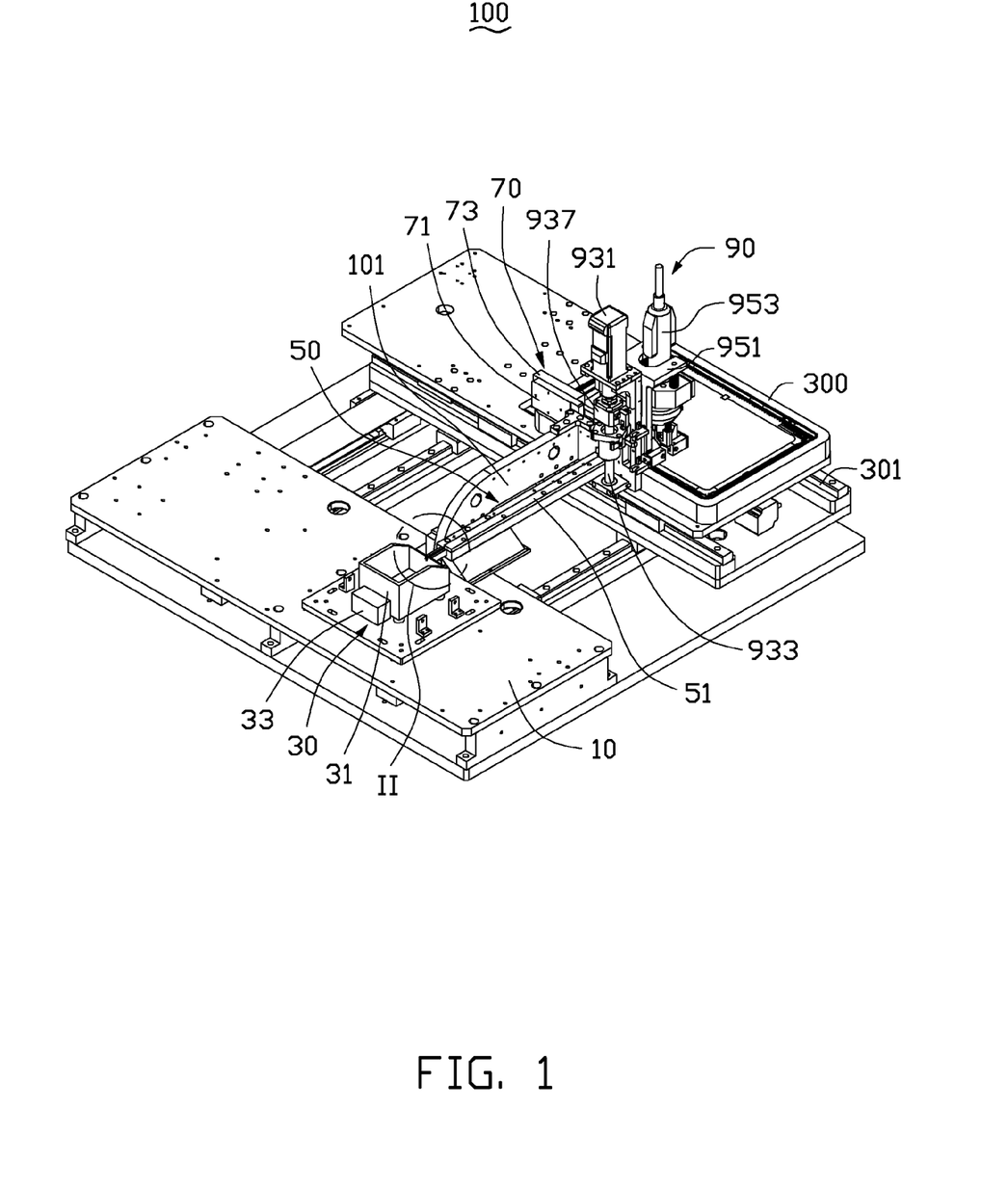
FIG. 1 is an isometric view of an embodiment of a screw fastening device.
Figure 3:
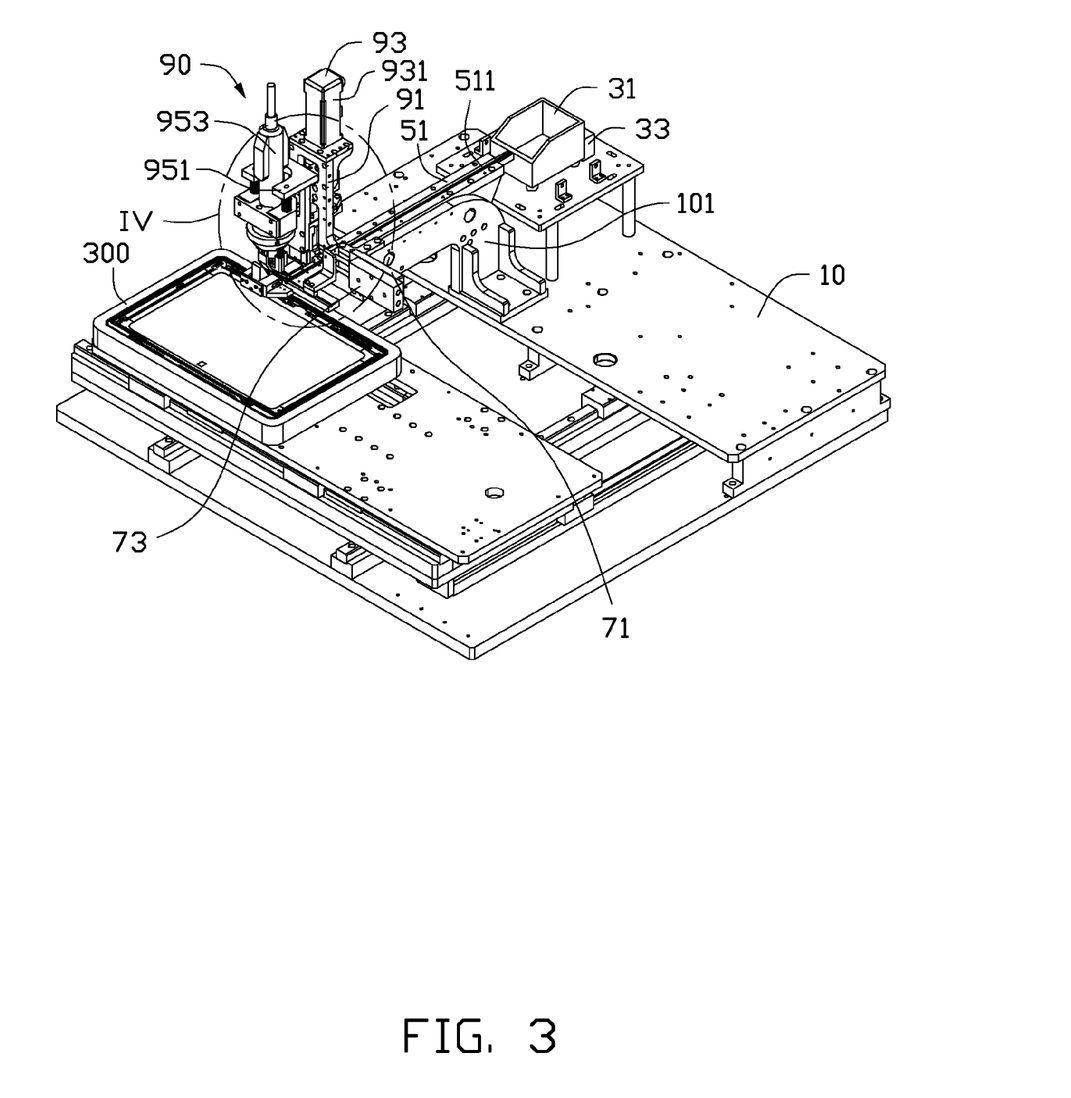
FIG. 3 is similar to FIG. 1, but view in another aspect.

FIGS. 1 and 3 show a screw fastening device 100 that may be used for automatically fastening a plurality of screws 200 (shown in FIG. 4) to a workpiece 300. The screw fastening device 100 includes a platform 10, a feeding mechanism 30, a transferring mechanism 50, a guiding mechanism 70, and a fastening mechanism 90. The feeding mechanism 30 and the transferring mechanism 50 are mounted on the platform 10. The transferring mechanism 50 is located adjacent to an end of the feeding mechanism 30, and communicating with the feeding mechanism 30. A fixing plate 101 is substantially perpendicularly mounted on the platform 10. The fixing plate 101 is substantially an L-shaped plate; an end of the fixing plate 101 is fixed on the platform 10 at a side of the transferring mechanism 50, and an opposite end of the fixing plate 101 outwardly extends towards the guiding mechanism 70. The guiding mechanism 70 and the fastening mechanism 90 are mounted on the fixing plate 101 above the platform 10, and are located adjacent to an end of the transferring mechanism 50 away from the feeding mechanism 30. The guiding mechanism 70 is located at a side of the transferring mechanism 50. The fastening mechanism 90 is located at an opposite side of the transferring mechanism 50. The guiding mechanism 70 communicates with the transferring mechanism 50. The feeding mechanism 30 is configured for receiving the screws 200, and transferring the screws 200 to the transferring mechanism 50 one by one. The transferring mechanism 50 is for configured transferring the screws 200 from the feeding mechanism 30 to the guiding mechanism 70. The guiding mechanism 70 is configured for guiding the screws 200 transferred by the transferring mechanism 50 to the fastening mechanism 90. The fastening mechanism 90 pneumatically grasps the screws 200 from the transferring mechanism 50, and fastens the screws 200 to the workpiece 300 in order.

Figure 2:
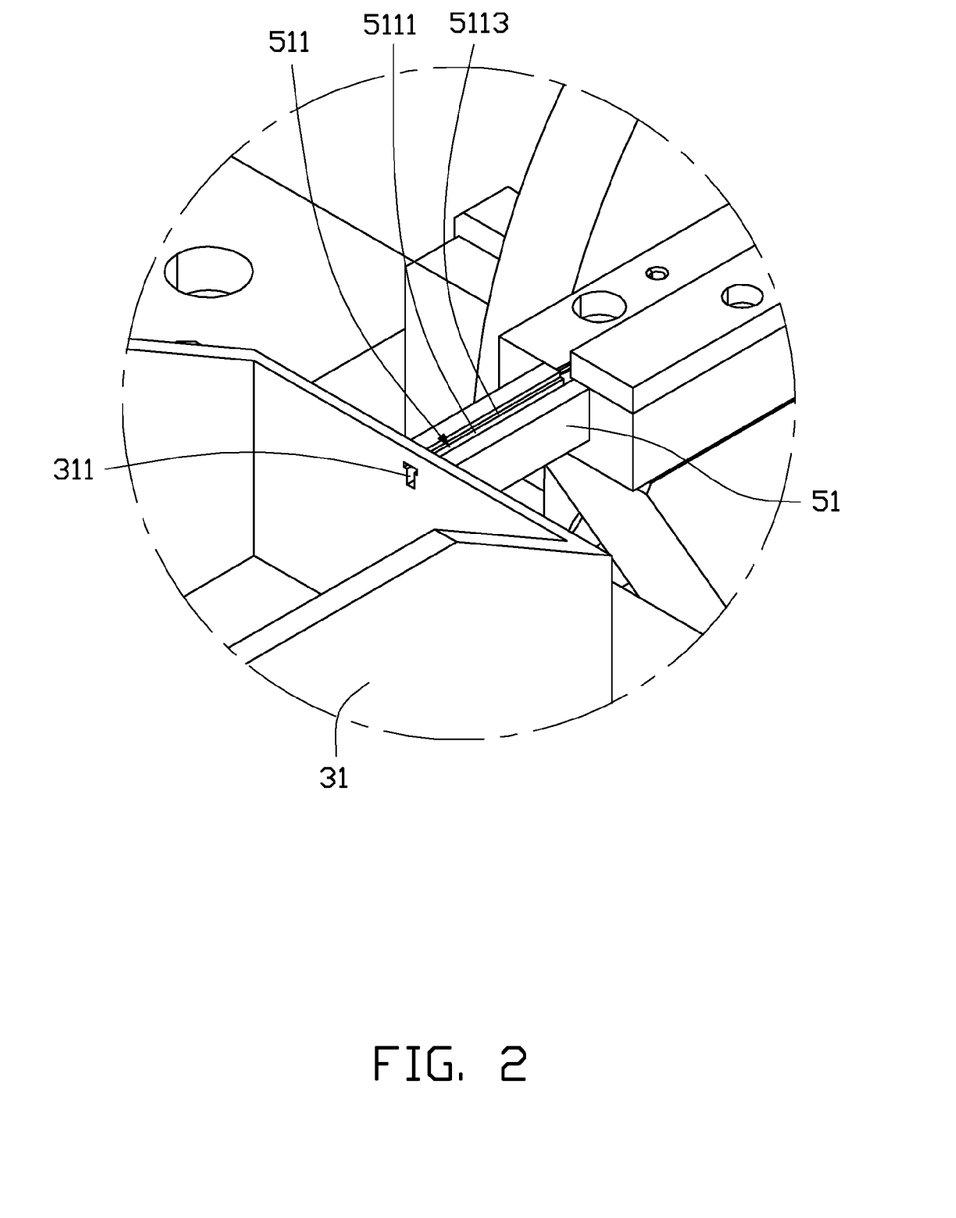
FIG. 2 is an enlarged, isometric view of a circled portion II in FIG. 1.

FIGS. 1 and 2 show the feeding mechanism 30, which includes a receiving box 31 and a feeding driver 33. The receiving box 31 is for receiving the screws 200. The receiving box 31 is substantially rectangular box, and defines a feeding hole 311 at a sidewall thereof adjacent to the transferring mechanism 50. A shape of the feeding hole 311 matches with a shape of the screw 200, for allowing the screws 200 to pass through the feeding hole 311. The feeding hole 311 communicates with the transferring mechanism 50, for allowing the screws 200 to move to the transferring mechanism 50 via the feeding hole 311. The feeding driver 33 is positioned besides the receiving box 31, and drives the screws 200 in the receiving box 31 to enter the feeding hole 311, thereby transferring the screws 200 automatically to the transferring mechanism 50. In the illustrated embodiment, the feeding mechanism 30 is a vibrating screw feeding mechanism 30. The feeding driver 33 drives the screws 300 in the receiving box 31 to vibrate, thereby passing the screws 300 through the feeding hole 311.

Figure 4:
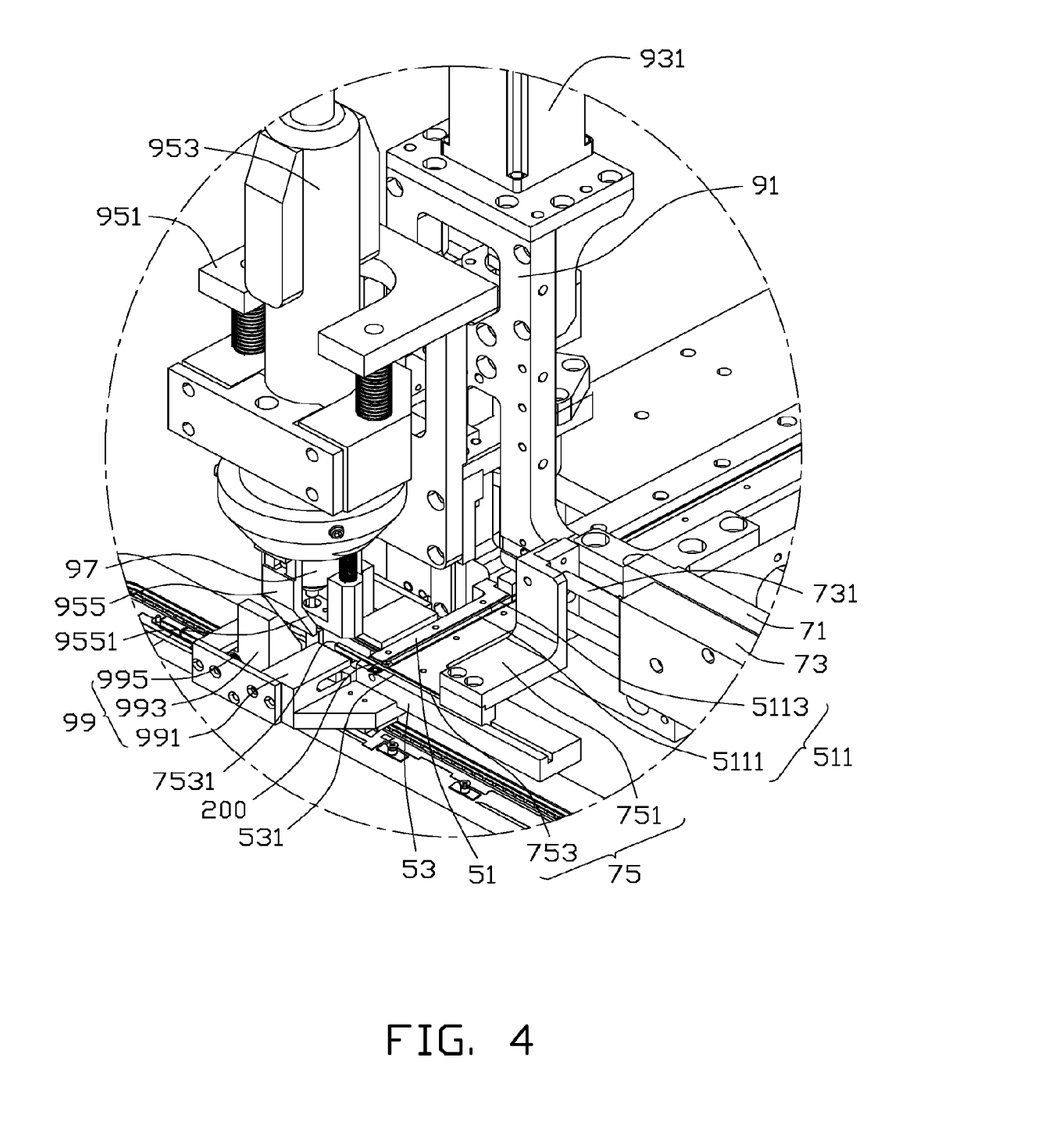
FIG. 4 is an enlarged, isometric view of a circled portion IV in FIG. 1.

FIGS. 1, 2, and 4 show the transferring mechanism 50 including a first transferring member 51 and a second transferring member 53 substantially perpendicularly connected to the first transferring member 51. An end of the first transferring member 51 away from the second transferring member 53 communicates with the feeding hole 311. Two opposite ends of the second transferring member 53 extend to the guiding mechanism 70 and the fastening mechanism 90, respectively.

The first transferring member 51 is mounted on the platform 10, and defines a first transferring groove 511 (shown in FIGS. 2 and 4) at a surface of the first transferring member 51 away from the platform 10. The second transferring member 53 is mounted on the platform 10, and defines a second transferring groove 531 (shown in FIG. 4) at a surface of the second transferring member 53 away from the platform 10. The second transferring groove 531 substantially perpendicularly communicates with the first transferring groove 511. A cross-section of the first transferring groove 511 and a cross-section of the second transferring groove 531 match the shape of the screw 200, thereby capable of sliding the screws 200 along the first transferring groove 511 and the second transferring groove 531. The first transferring groove 511 includes a screw bolt receiving groove 5111 adjacent to the platform 10 and a screw head receiving groove 5113 away from the platform 10. The second transferring groove 531 includes a screw bolt receiving groove adjacent to the platform 10 and a screw head receiving groove away from the platform 10. The screw head receiving groove 5113 communicates with the screw bolt receiving groove 5111. The screw head receiving groove communicates with the screw bolt receiving groove. When the screws 200 are transferred or convey along in the first transferring groove 511 or the second transferring groove 513, a screw bolt of the screw 200 is received in the screw bolt receiving groove 5111, and a screw head of the screw 200 is received in the screw head receiving groove 5113, thus the screw 200 is vertically conveyed and transported.

FIGS. 1, 3 and 4 show that the guiding mechanism 70 is mounted on an end of the second transferring member 53 opposite to the fastening mechanism 90. The guiding mechanism 70 includes a mounting plate 71, a driver 73, and a guiding member 75. The mounting plate 71 is fixed on an end of the fixing plate 101 away from the platform 10. The driver 73 is mounted on the mounting plate 71. The driver 73 forms a driving end 731 towards the fastening mechanism 90. The guiding member 75 is positioned on the driving end 731, and is capable of being slidingly driven by the driver 73. The guiding member 75 includes a fixing portion 751 and a guiding portion 753 formed on an end of the fixing portion 751 away from the driver 73.

The fixing portion 751 is substantially cubic, and is fixed on the driving end 731, and is located upon the second transferring groove 531. The guiding portion 753 is substantially a rod, and is received in the screw bolt receiving groove of the second transferring groove 531. The guiding portion 753 defines an arcuate groove 7531 at an end away from the fixing portion 751. A shape of the arcuate groove 7531 matches with a profile of the screw bolt of the screw 200. Before the guiding member 75 is driven by the driver 73, the end of the guiding portion 753 away from the fixing portion 751 is located in a portion of the second transferring groove 531 between the fixing portion 751 and an intersecting portion of the first transferring groove 511 and the second transferring groove 531. When the guiding member 75 is driven by the driver 73, the guiding portion 753 slides along the second transferring groove 531, and pushes the screw 200 in the second transferring groove 531 to move along until the screw 200 is detached from the second transferring groove 531. The screw bolt of the screw 200 is received in the arcuate groove 7531, and the screw head of the screw 200 is supported by the guiding portion 753. The screw 200 stands or is being held vertically, for the sake of convenience of the fastening mechanism 90 to pick up or held by suction. In an alternative embodiment, a magnet may be mounted on the guiding portion 753, for improving a supporting attracting force to the screw 200. In the illustrated embodiment, the driver 73 is a cylinder.

Figure 5:
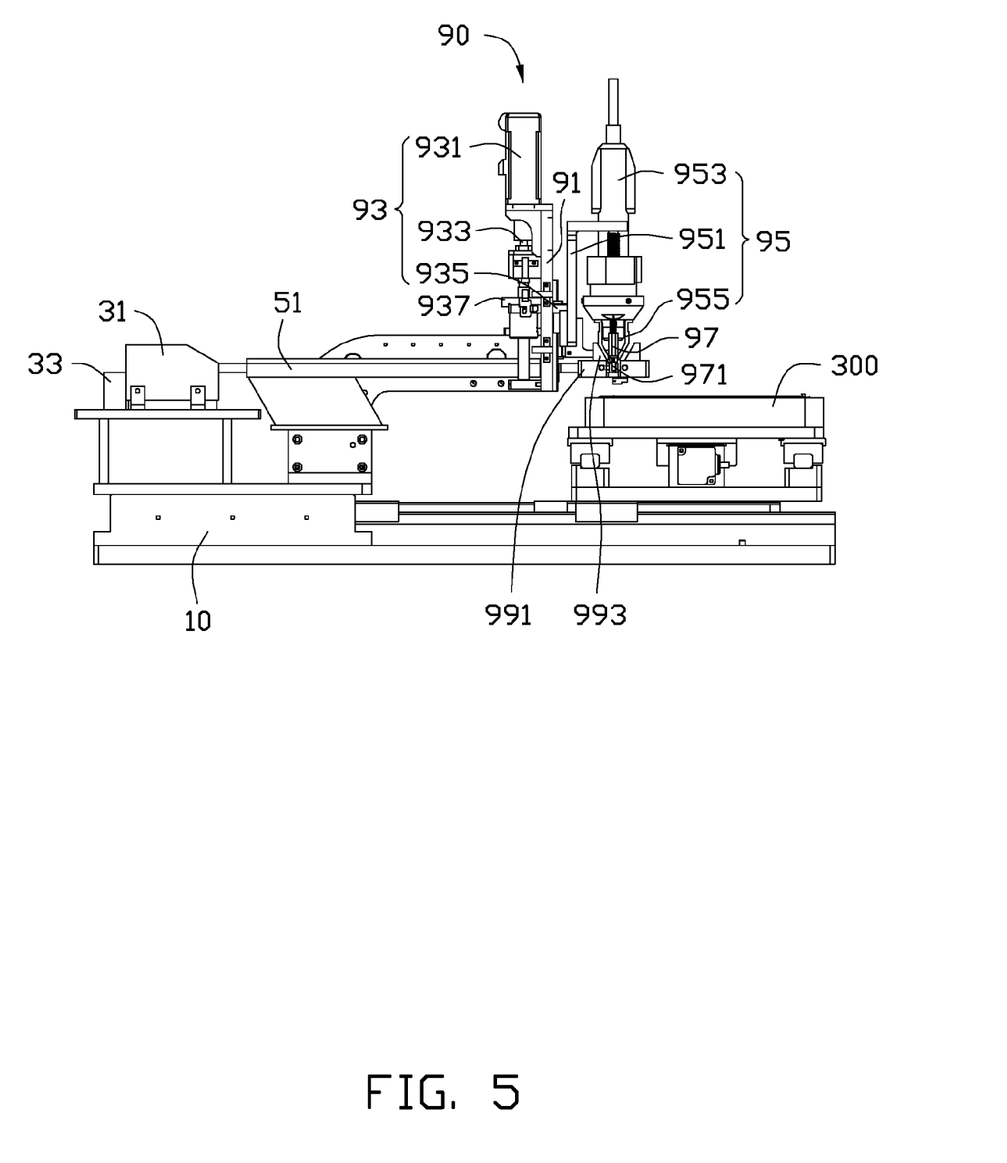
FIG. 5 is similar to FIG. 1, but view in another aspect.

FIGS. 4 and 5 show that the fastening mechanism 90 is located at an end of the second transferring member 53 away from the guiding mechanism 70. The fastening mechanism 90 includes a mounting plate 91 (shown in FIG. 3), a first driving assembly 93, a second driving assembly 95, a pneumatic sucker 97, and a buffering assembly 99. The mounting plate 91 is fixed on an end of the fixing plate 101 away from the platform 10. The first driving assembly 93 is mounted on a side of the mounting plate 91 adjacent to the feeding mechanism 30. The second driving assembly 95 is mounted on a side of the mounting plate 91 opposite to the first driving assembly 93, and the second driving assembly 95 is fixed with the first driving assembly 93. The pneumatic sucker 97 is mounted on an end of the second driving assembly 95 adjacent to the platform 10, for grasping and holding on to the screw 200 by suction. The first driving assembly 93 drives the second driving assembly 95 and the pneumatic sucker 97 to move vertically together. The second driving assembly 95 drives the pneumatic sucker 97 to rotate. The buffering assembly 99 is mounted on the mounting plate 91, and is positioned below the pneumatic sucker 97.

The first driving assembly 93 includes a driving member 931, a sliding rod 933, and a fixing member 935. The driving member 931 is fixed at an end of the mounting plate 91 away from the platform 10. The sliding rod 933 is fixed on the driving member 931, and is located at a side of the driving member 931 adjacent to the platform 10. The driving member 931 drives the sliding rod 933 to extend along an axis of the sliding rod 933. The fixing member 935 is substantially cubic, in which an end thereof is mounted on the sliding rod 933 via a flange 937, and an opposite end of the fixing member 935 passes through the mounting plate 91 and connects with the second driving assembly 95, thereby having the second driving assembly 95 moving together with the sliding rod 933. In the illustrated embodiment, the driving member 931 is a motor. In an alternative embodiment, the driving member 931 may be a cylinder.

The second driving assembly 95 includes a fixing frame 951, a driver 953, and a pair of resisting members 955. The fixing frame 951 is fixed on an end of the fixing member 935 away from the sliding rod 933. The driver 953 is substantially cylindrical, and is received in the fixing frame 951, for driving the pneumatic sucker 97 to rotate. The resisting members 955 are mounted on opposite sides of the driver 953, for engaging with the buffering assembly 99 to buffer the pneumatic sucker 97. The pneumatic sucker 97 is mounted at an end of the driver 953 adjacent to the platform 10, and is located between the pair of resisting members 955, and slide from the pair of resisting members 955. The pneumatic sucker 97 forms a suction end 971 adjacent to the platform 10, for pneumatically grasping and holding the screw 200. In an alternative embodiment, the fixing frame 951 may be directly connected to the sliding rod 933.

The buffering assembly 99 includes a mounting frame 991, a pair of engaging members 993, and a pair of elastic members 995. The mounting frame 991 is fixed on the mounting plate 91 via plates, and is located below the driver 953 and the resisting members 955. The mounting frame 991 is substantially a hollow rectangular frame, and the engaging members 993 and the elastic members 995 are received in the mounting frame 991. The engaging members 993 are substantially triangular, and are located at two opposite sides of the pneumatic sucker 97, and an inclined edge 9551 of the resisting member 955 faces the pneumatic sucker 97. Two ends of each of the elastic members 995 are respectively positioned on one corresponding engaging member 993 and a side of the mounting frame 991 near the corresponding engaging member 993. A shape of the engaging member 993 matches with a shape of the resisting member 955 of the second driving assembly 95. When the driving member 931 drives the second driving assembly 95 to move downward, the resisting members 955 insert into the pair of engaging member 993, and resisting the engaging members 993 to press against the elastic members 995, thereby driving the second driving assembly 95 and the pneumatic sucker 97 downward slowly.

The screw fastening device 100 further includes a rail 301 located at a side of the fastening mechanism 90 away from the feeding mechanism 30, and parallel to the second transferring member 53. The rail 301 is configured for transferring the workpiece 300 to the pneumatic sucker 97.

In assembly, first, the receiving box 31 and the feeding driver 33 are positioned on the platform 10, and the feeding driver 33 is connected to the receiving box 31. The transferring mechanism 50 is mounted on the platform 10, and the first transferring groove 511 communicates with the feeding hole 311 of the receiving box 31. The fixing plate 101 is fixed on the platform 10, and the driver 73 is mounted on the fixing plate 101 via the mounting plate 71. The fixing portion 751 is fixed on the driving end 731, and the guiding portion 753 is partially received in the screw bolt receiving groove of the second transferring groove 531. Second, the mounting plate 91 is fixed on the fixing plate 101, and the driving member 931 is fixed on the mounting plate 91. The sliding rod 933 is mounted on an end of the driving member 931 adjacent to the platform 10. The fixing member 935 is fixedly connected to the sliding rod 933. The fixing frame 951 is mounted on the fixing member 935, and the driver 953 is received in the fixing frame 951. The resisting members 955 are mounted at opposite sides of the driver 953. Third, the pneumatic sucker 97 is positioned at an end of the driver 953 adjacent to the platform 10, and is located between the pair of the resisting members 955. The mounting frame 991 is fixed on the mounting plate 91, and the engaging members 993 are mounted within the mounting frame 991 via the pair of elastic members 995.

In use, the workpiece 300 is put on the rail 301, and is conveyed or transported below the pneumatic sucker 97 via the rail 301. Screws 200 are put into the receiving box 31, and the feeding driver 33 drives the screws 200 to vibrate, thereby moving the screws 200 to the first transferring groove 511 via the feeding hole 311. The screw bolt of the screw 200 is received in the screw bolt receiving groove 5111 of the first transferring groove 511, and the screw head of the screw is received in screw head receiving groove 5113 of the first transferring groove 511. When one of the screws 200 is transferred to an intersecting junction region or portion of the first transferring groove 511 and the second transferring groove 531, the guiding portion 753 is driven by the driver 73 to resist the screw 200 to slide along the second transferring groove 531 until at a location adjacent to the pneumatic sucker 97. The screw 200 is supported by the guiding portion 753, and is positioned below the pneumatic sucker 97.

The pneumatic sucker 97 is driven by the driver 931 to move vertically, and the suction end 971 hold on to the screw 200. The driver 931 drives the pneumatic sucker 97 and the screw 200 to keep moving vertically, thus the resisting members 955 are inserted into the pair of engaging members 993. The elastic members 995 are pressed by the engaging members 993, and a speed of the pneumatic sucker 97 is slowed down. Until the pneumatic sucker 97 moves and is positioned to a predetermined portion of the workpiece 300, the driver 931 stops to drive the pneumatic sucker 97. The driver 953 of the second driving member 95 drives the pneumatic sucker 97 to rotate, thus the screw 200 grasped and held by the suction end 971 is fastened into the predetermined portion of the workpiece 300. At the same time, another screw 200 is conveyed or transported along the second transferring groove 531, and is finally supported by the guiding portion 753. When the fastening mechanism 90 finishes fastening the screw 200, and the pneumatic sucker 97 is driven by the driver 931 to move upward, to hold on to another screw 200 by suction to fasten to the workpiece 300.

In an alternative embodiment, the fastening mechanism 90 may be fixed at an end of the first transferring member 51 away from the receiving box 31, and the second transferring member 53 and the guiding mechanism 70 may be omitted. The fastening mechanism 90 directly holds the screws 200 by suction to be transported or conveyed along the first transferring groove 511. In an alternative embodiment, the feeding mechanism 30 may be omitted, and an operator can put the screws 200 on the first transferring groove 511.

It is believed that the present embodiments and their advantages will be understood from the foregoing description, and it will be apparent that various changes may be made thereto without departing from the spirit and scope of the embodiments or sacrificing all of its material advantages.

What is claimed is:

1. A screw fastening device, for fastening screws to a workpiece conveyed by a rail, comprising:
   a platform;
   a transferring mechanism mounted on the platform, the transferring mechanism comprising a first transferring member and a second transferring member connected to the first transferring member, the first transferring member defining a first transferring groove at a surface of the first transferring member away from the platform for transferring the screws, the second transferring member defining a second transferring groove at a surface thereof away from the platform, the first transferring groove intersecting and communicating with the second transferring groove;
   a guiding mechanism comprising:
      a mounting plate fixed on the platform,
      a driver fixed on an end of the mounting plate away from the platform, and
      a guiding member comprising a fixing portion fixed on the driver, and a guiding portion mounted on the fixing portion, the guiding portion partially received in the second transferring groove, wherein, when the guiding member is driven by the driver, the guiding portion slides along the second transferring groove, and pushes a screw in the second transferring groove to the pneumatic sucker;
   a fastening mechanism comprising a mounting plate, a first driving assembly, a second driving assembly, and a pneumatic sucker, the mounting plate fixed on the platform, the first driving assembly mounted on the mounting plate, the second driving assembly fixedly connected to the first driving assembly, the pneumatic sucker mounted on an end of the second driving assembly adjacent to the platform, and located adjacent to an end of the first transferring groove, the first driving assembly driving the second driving assembly and the pneumatic sucker to move along an axis of the pneumatic sucker, the second driving assembly driving the pneumatic sucker to rotate, a suction end formed at an end of the pneumatic sucker adjacent to the platform, the suction end driven by the first driving assembly to hold the screw by suction, and to position the screw to a predetermined portion of the workpiece, the second driving assembly driving the pneumatic sucker to rotate to fasten the screw on the workpiece.

2. The screw fastening device of claim 1, wherein the screw fastening device further comprises a feeding mechanism, the feeding mechanism comprises a receiving box for receiving screws, and a feeding driver connected to the receiving box, the receiving box defines a feeding hole communicating with the first transferring groove of the first transferring member, a shape of the feeding hole matches with a shape of the screw, the feeding driver drives the screws in the receiving box to move to the first transferring groove one by one via the feeding hole.

3. The screw fastening device of claim 2, wherein the pneumatic sucker is located at an end of the second transferring member.

4. The screw fastening device of claim 3, wherein the first transferring groove comprises a screw bolt receiving groove and a screw head receiving groove communicating with the screw bolt receiving groove, the screw bolt receiving groove is located at a side of the screw head receiving groove adjacent to the platform.

5. The screw fastening device of claim 4, wherein the guiding mechanism is located at an end of the second transferring member away from the fastening mechanism.

6. The screw fastening device of claim 1, wherein the guiding portion defines an arcuate groove at an end thereof away from the fixing portion, a shape of the arcuate groove matches with a profile of a screw bolt of the screw, the screw bolt of the screw is received in the arcuate groove, and a screw head of the screw is supported by the guiding portion.

7. The screw fastening device of claim 1, wherein the first driving assembly comprises a driving member and a sliding rod, the driving member is fixed on an end of the mounting plate away from the platform, the sliding rod is positioned at an end of the driving member adjacent to the platform, the second driving assembly is fixed on the sliding rod, the driving member drives the sliding rod, the second driving assembly, and the pneumatic sucker to move vertically.

8. The screw fastening device of claim 7, wherein the first driving assembly further comprises a fixing member mounted on the sliding rod, the second driving assembly comprises a fixing frame and a driver, the fixing frame is fixed on the fixing member, the driver of the second driving assembly is received in the fixing frame, the pneumatic sucker is fixed on an end of the driver of the second driving assembly adjacent to the platform, the second driving assembly drives the pneumatic sucker to rotate.

9. The screw fastening device of claim 8, wherein the second driving assembly further comprises a pair of resisting members, the resisting members are positioned at an end of the driver of the second driving assembly adjacent to the platform, and are located on opposite sides of the pneumatic sucker, the screw fastening device further comprises a buffering assembly, the buffering assembly comprises a mounting frame, a pair of engaging members and a pair of elastic members, the mounting frame is positioned on the mounting plate, and is located at an end of the pneumatic sucker adjacent to the platform, the engaging members are mounted on the mounting frame via the elastic members, and the engaging members are located below the pneumatic sucker, the resisting members resist the engaging members to press against the elastic members, thereby slowing down a speed of the pneumatic sucker.

10. The screw fastening device of claim 9, wherein a shape of the engaging member is substantially triangular, and an inclined edge of one engaging member faces an inclined edge of an another engaging member, a shape of the resisting member matches with a shape of the inclined edge of the engaging member.

11. An screw fastening device, for fastening screws to a workpiece conveyed by a rail, comprising:
   a platform;
   a feeding mechanism;
   a transferring mechanism mounted on the platform and communicated with the feeding mechanism, for transferring the screws, the transferring mechanism comprising a first transferring member and a second transferring member connected to the first transferring member, the first transferring member defining a first transferring groove at a surface of the first transferring member away from the platform for transferring the screws, the second transferring member defining a second transferring groove at a surface thereof away from the platform, the first transferring groove intersecting and communicating with the second transferring groove;
   a guiding mechanism comprising:
      a mounting plate fixed on the platform,
      a driver fixed on an end of the mounting plate away from the platform, and
      a guiding member comprising a fixing portion fixed on the driver, and a guiding portion mounted on the fixing portion, the guiding portion partially received in the second transferring groove, wherein, when the guiding member is driven by the driver, the guiding portion slides along the second transferring groove, and pushes a screw in the second transferring groove to the pneumatic sucker;
   a fastening mechanism comprising a mounting plate, a first driving assembly, a second driving assembly, and a pneumatic sucker, the mounting plate fixed on the platform, the first driving assembly mounted on the mounting plate, the second driving assembly fixedly connected to the first driving assembly, the pneumatic sucker mounted on an end of the second driving assembly adjacent to the platform, and located adjacent to an end of the transferring mechanism, the first driving assembly driving the second driving assembly and the pneumatic sucker to move along an axis of the pneumatic sucker, the second driving assembly driving the pneumatic sucker to rotate.

12. The screw fastening device of claim 11, wherein the feeding mechanism comprises a receiving box for receiving screws, and a feeding driver connected to the receiving box, the receiving box defines a feeding hole communicating with the first transferring groove of the first transferring member, a shape of the feeding hole matches with a shape of the screw, the feeding driver drives the screws in the receiving box to move to the first transferring groove one by one via the feeding hole.

13. The screw fastening device of claim 12, wherein the pneumatic sucker is located at an end of the second transferring member.

14. The screw fastening device of claim 13, wherein the first transferring groove comprises a screw bolt receiving groove and a screw head receiving groove communicating with the screw bolt receiving groove, the screw bolt receiving groove is located at a side of the screw head receiving groove adjacent to the platform.

15. The screw fastening device of claim 14, wherein the guiding mechanism is located at an end of the second transferring member away from the fastening mechanism.

16. The screw fastening device of claim 11, wherein the guiding portion defines an arcuate groove at an end thereof away from the fixing portion, a shape of the arcuate groove matches with a profile of a screw bolt of the screw, the screw bolt of the screw is received in the arcuate groove, and a screw head of the screw is supported by the guiding portion.

17. The screw fastening device of claim 11, wherein the first driving assembly comprises a driving member and a sliding rod, the driving member is fixed on an end of the mounting plate away from the platform, the sliding rod is positioned at an end of the driving member adjacent to the platform, the second driving assembly is fixed on the sliding rod, the driving member drives the sliding rod, the second driving assembly, and the pneumatic sucker to move vertically.

18. The screw fastening device of claim 17, wherein the first driving assembly further comprises a fixing member mounted on the sliding rod, the second driving assembly comprises a fixing frame and a driver, the fixing frame is fixed on the fixing member, the driver of the second driving assembly is received in the fixing frame, the pneumatic sucker is fixed on an end of the driver of the second driving assembly adjacent to the platform, the second driving assembly drives the pneumatic sucker to rotate.

19. The screw fastening device of claim 18, wherein the second driving assembly further comprises a pair of resisting members, the resisting members are positioned at an end of the driver of the second driving assembly adjacent to the platform, and are located at opposite sides of the pneumatic sucker, the screw fastening device further comprises a buffering assembly, the buffering assembly comprises a mounting frame, a pair of engaging members and a pair of elastic members, the mounting frame is positioned on the mounting plate, and is located at an end of the pneumatic sucker adjacent to the platform, the engaging members are mounted on the mounting frame via the elastic members, and the engaging members are located below the pneumatic sucker, the resisting members resist the engaging members to press against the elastic members, thereby slowing down a speed of the pneumatic sucker.

20. The screw fastening device of claim 19, wherein a shape of the engaging member is substantially triangular, and an inclined edge of one engaging member faces an inclined edge of an another engaging member, a shape of the resisting member matches with a shape of the inclined edge of the engaging member.

\* \* \* \* \*